UNITED STATES PATENT OFFICE.

OSKAR FÖRSTER, OF LONDON, ENGLAND, ASSIGNOR, BY MESNE ASSIGNMENTS, TO UNIVERSAL CHROMEPHOTO ENGRAVING COMPANY, OF NEW YORK, N. Y., A CORPORATION OF SOUTH DAKOTA.

METHOD OF PRODUCING PRINTING-SURFACES.

SPECIFICATION forming part of Letters Patent No. 723,198, dated March 17, 1903.

Application filed January 10, 1900. Serial No. 989. (No specimens.)

*To all whom it may concern:*

Be it known that I, OSKAR FÖRSTER, a subject of the Emperor of Germany, residing at 30 Cedars avenue, Hoe street, Walthamstow, London, England, have invented certain new and useful Improvements in Methods of Producing Printing-Surfaces, of which the following is a specification.

My invention relates to a new and improved method of transferring photographic pictures from negatives to lithographers' stones or to plates of zinc, copper, aluminium, and the like in such manner as to produce upon the surfaces of said stones or plates a positive copy of the negative ready for reproduction by lithographic or plate printing.

Prior to my invention the reproduction of photographs by printing has been accomplished usually by interposing a ruled or grained transparent screen between the sensitized surface and the negative, so as to divide the picture into regularly-disposed dots, grains, or stipples of regular diameter, or by the employment of a lithographic crayon of ink having a surface grain of suitable fineness, or for intaglio printing by producing an asphalt grain on the printing-surface before the application of the picture. Printing-surfaces so produced rarely yield more than five hundred good impressions even under the most favorable conditions, whereas a stone or plate prepared in accordance with the present invention may be utilized to give five thousand or more perfect copies, reproducing all the details of the picture and all its tones or light effects.

In preparing the lithographic stone or metal plate for carrying out the present process I preferably roughen the surface thereof by means of a very fine sand blast in order to obtain a uniformly fine grain, if desired, although this preliminary operation is intended particularly for the purpose of cleaning the plate and giving it a uniform surface. The plate is then carefully brushed off and washed with a weak solution of nitric acid. It is then warmed and its surface coated with a weak solution of isinglass or other gelatinous substance, which coating is allowed to dry at a temperature of about 100° Fahrenheit. A solution consisting of two thousand parts, by weight, of distilled water, twenty parts, by weight, of albumen, and ten parts, by weight, of saccharic acid is thereupon applied to the coated surface by means of a fine brush and is allowed to dry thereon. I then make a mixture of equal quantities of the two following solutions, to wit: Solution A: one thousand parts, by weight, of distilled water, fifty parts, by weight, of zinc chlorid, and two parts, by weight, of chrysanilin. Solution B: five hundred parts, by weight, of distilled water, fifteen parts, by weight, of ammonium bichromate, and seven parts, by weight, of potassium bichromate. I cover the prepared surface with a coating of this mixture and then place the plate or stone in an upright position in order to allow the liquid to drain off. When the resultant film is thoroughly dry, the photographic negative is placed upon it and exposure is made with a good light of normal intensity. From ten to fifteen minutes will be required for completing the exposure. The surface is then rolled with a neutral ink, applied by a stiff roller, said ink consisting, preferably, of suitable proportions of lampblack, wax, Venetian turpentine, lithographic ink, and a few drops of oil of lavender, melted together, well mixed, and ground up with small quantities of finely-powdered asphaltum, colophony or resin, and pure beef-fat. The picture is thereupon developed by lightly passing over it a sponge saturated with water until the picture shows clearly, whereupon the surface is carefully cleaned and covered with a coating of dissolved gum-arabic for the purpose of protecting it from dust and other impurities. The gum-arabic is subsequently washed off and the ink is removed by the aid of turpentine, whereupon the surface is washed with dilute nitric acid in order to decompose those portions of the sensitive film which have not been chemically changed by the action of light. The surface is then wet with a weak salt-water solution and is rolled up with strong ink until the picture shows up well, any necessary retouching being done with lithographic ink or the like. Finally the surface is subjected to the well-known acid or etching treatment customary with lithographic chalk-drawings, and the stone is then ready for the ordinary lithographic-printing process.

The characteristic feature of my invention over the prior state of the art consists in avoiding the employment of the customary net and its equivalents and printing the picture upon a sensitized coating whose surface itself presents a very finely stippled or grained appearance due to the crystallizing out during the drying operation of the salts contained in the solution from which the film is made. So far as I am aware the employment of this expedient for obtaining the effects described is broadly new with me, and I desire, therefore, that my claim should have a correspondingly-generic interpretation.

Having thus described my invention, what I claim is—

The herein-described method of producing printing-surfaces upon lithographers' stones or metal plates, which consists in coating the stone or plate with a sensitized film containing salts which when the film is dry, crystallize out to form a fine even surface grain or stipple, printing a picture thereon through a negative by the action of light, and thereupon washing, inking and etching; substantially as described.

In testimony whereof I have hereunto set my hand in presence of two subscribing witnesses.

OSKAR FÖRSTER.

Witnesses:
H. D. JAMESON,
T. L. RAND.